(12) United States Patent
Enserink

(10) Patent No.: US 11,180,231 B2
(45) Date of Patent: Nov. 23, 2021

(54) KITE CONTROL BAR STOPPER FOR A SLEEVED LINE

(71) Applicant: OCEAN RODEO SPORTS INC., Victoria (CA)

(72) Inventor: Anton Rudolph Enserink, Dordrecht (NL)

(73) Assignee: OCEAN RODEO SPORTS INC., Victoria (CA)

( * ) Notice: Subject to any disclaimer, the term of this patent is extended or adjusted under 35 U.S.C. 154(b) by 391 days.

(21) Appl. No.: 16/312,075

(22) PCT Filed: Jun. 16, 2017

(86) PCT No.: PCT/CA2017/050738
§ 371 (c)(1),
(2) Date: Dec. 20, 2018

(87) PCT Pub. No.: WO2018/000083
PCT Pub. Date: Jan. 4, 2018

(65) Prior Publication Data
US 2019/0161171 A1    May 30, 2019

Related U.S. Application Data

(60) Provisional application No. 62/355,218, filed on Jun. 27, 2016.

(51) Int. Cl.
*B63H 8/16* (2020.01)
*B64C 31/06* (2020.01)
(Continued)

(52) U.S. Cl.
CPC ............... *B63H 8/16* (2020.02); *B64C 13/30* (2013.01); *B64C 31/06* (2013.01); *F16G 11/04* (2013.01); *F16M 11/046* (2013.01)

(58) Field of Classification Search
CPC .... B63H 8/10; B63H 8/16; B63H 8/18; B64C 13/30; B64C 31/06; A62B 1/14
See application file for complete search history.

(56) References Cited

U.S. PATENT DOCUMENTS

| | | | | |
|---|---|---|---|---|
| 4,531,610 A | * | 7/1985 | Fertier | A62B 35/04 182/192 |
| 6,899,203 B1 | * | 5/2005 | Golden | A62B 1/14 182/5 |

(Continued)

FOREIGN PATENT DOCUMENTS

| | | |
|---|---|---|
| CA | 2 943 724 A1 | 10/2015 |
| FR | 2 862 943 A1 | 6/2005 |
| WO | 2015/110234 A1 | 7/2015 |

OTHER PUBLICATIONS

International Search Report Corresponding to PCT/CA2017/050738 dated Sep. 14, 2017.

(Continued)

*Primary Examiner* — Richard R. Green
*Assistant Examiner* — Michael A. Fabula
(74) *Attorney, Agent, or Firm* — Finch & Maloney, PLLC; Michael J. Bujold; Jay S. Franklin

(57) ABSTRACT

A control bar stopper includes a stopper body having a sleeved line receiving slip groove that allows sleeved line slippage. The stopper body has an underlying control bar bumper. A brake body is provided having a sleeved line receiving stop groove that resists sleeved line slippage. The brake body is smaller than the stopper body and is positioned above and at a distance from the control bar bumper with the stop groove facing the slip groove. A pivotal link connects the stopper body and the brake body. In response to a control bar striking the control bar bumper, the slip groove allows the stopper body to slide along a sleeved line and as the stopper body slides along the sleeved line, the brake body (Continued)

pivots about the pivotal link into stop contact with the sleeved line with the stop groove resisting further slippage.

6 Claims, 4 Drawing Sheets

(51) Int. Cl.
*F16G 11/04* (2006.01)
*F16M 11/04* (2006.01)
*B64C 13/30* (2006.01)

(56) References Cited

U.S. PATENT DOCUMENTS

| | | | | |
|---|---|---|---|---|
| 9,604,079 B2* | 3/2017 | Merritt | ............... | A63B 29/08 |
| 10,427,766 B2* | 10/2019 | Myerscough | ............ | B63H 8/54 |
| 10,780,363 B2* | 9/2020 | Van der Westhuizen | ................... | B65H 75/4428 |
| 2004/0004160 A1* | 1/2004 | Pouchkarev | .............. | B63H 8/16 244/146 |
| 2006/0226294 A1* | 10/2006 | Logosz | ................... | B63B 32/70 244/152 |
| 2008/0035796 A1* | 2/2008 | See | .......................... | B63B 32/70 244/155 A |
| 2008/0067291 A1* | 3/2008 | Logosz | ................... | B63H 8/12 244/155 A |
| 2012/0049006 A1* | 3/2012 | Logosz | ................... | B63B 32/70 244/155 A |

OTHER PUBLICATIONS

Written Opinion Corresponding to PCT/CA2017/050738 dated Sep. 14, 2017.

* cited by examiner

KITE CONTROL BAR STOPPER FOR A SLEEVED LINE

FIELD

The present invention relates to rider control systems for propulsive wing and sport traction kites. More particularly the present invention relates to a kite control bar stopper applicable on a smooth and flexible sleeved line.

BACKGROUND

Using a kite for wind-driven propulsion of water, land, ice and or snow-craft is highly effective and simple compared to other means of wind-driven propulsion like sails and turbines. A kite can be constructed in such a way that all or most of the pulling force enters the craft in one point, without resulting momentum that can tip the craft over and without the requirements for rigid elements like masts, poles and shafts connected to the craft. Kites are flying remote from the craft, in air layers with stronger winds, and can fly in figures across the sky in order to generate apparent wind, thus increasing the power. Thus, kites are very efficient as means to derive power from the wind. Traction kites need to be manipulated constantly in order to control the flying trajectory of the kite to generate the required traction, to handle wind-gusts, and to keep the kite from falling to the ground.

For smaller crafts, like buggies, surfboards and dinghies, the kite can be controlled by hand. One common way of manipulating a kite is by means of a 3 point control system, where one centrally placed line bears the main load of the kite, and two control lines are manipulated to sheet in and out the flexible left and right tips of the kite. The centrally place line attaches to a structural part of the craft, or, in case of surf style kiting where the rider stands on a wheeled or sliding board, to a point on a harness worn by the rider, and whereby the two control lines attach to the ends of a control bar. The control bar often features a central hole through which the central load bearing line is slideably led. In analogy to sheeting a sail on a sail craft, by sliding the bar away from the fixed point on the central load bearing line, the tips of the kite are sheeted out, allowing the wind to pass the kites canopy, while by sliding the bar towards the fixed point on the central load bearing line, the kite catches more wind and will thus power up. By pulling one side of the bar, the kite will sheet in on the side pulled, and out on the other. This will cause the kite to turn around the sheeted in side. The sliding motion or "stroke" of the bar is limited on one side by the assembly that attaches to the rider's harness, and on the other by either the length of the riders arms or parts of the control system.

In order to control the kite comfortably and safely, kite control systems all allow for some degree of correction for stronger winds or larger kites, or to adapt the kite to a different riding style. By correcting the length of the load bearing line relative to the control lines, as well as by limiting the bar stroke to a pre-set length, the bar stroke can be matched with the circumstances and style of the rider.

To set the length of the bare stroke at the side opposing the assembly that attaches to the riders harness, bar-stoppers are usually deployed. Some bar stoppers are mounted in a fixed position on the central load bearing line. While this effectively limits the bar stroke, it may be desirably to set the bar stopper in another location on the central load bearing line to increase the bar stroke, for instance when kiting in strong, gusty winds or when riding waves. It may also be desirable to set the bar-stopper to shorten the bar stroke, such to perform aerial tricks where the rider takes both hands off the bar.

Adjustable bar-stoppers are available with a set screw knob that allows the rider to relocate the bar-stopper. Other adjustable bar-stoppers automatically pinch one or two load bearing center-lines when the control bar engages the stopper, causing such stoppers to lock on the center line or lines. Such systems are reliable and strong, and their position can be adjusted "on the fly". A disadvantage is that, together with the control bar, they can cause wear on the load bearing lines. In order to reduce wear on the load bearing center-line, some kite control systems feature a sleeve from flexible, smooth material. For instance, polyurethane tubing is commonly used as center-line sleeve.

SUMMARY

There is provided a control bar stopper which includes a stopper body having a sleeved line receiving slip groove that allows sleeved line slippage. The stopper body having an underlying control bar bumper. A brake body is provided having a sleeved line receiving stop groove that resists sleeved line slippage. The brake body is smaller than the stopper body and is positioned above and at a distance from the control bar bumper with the stop groove facing the slip groove. A pivotal link connects the stopper body and the brake body. In response to a control bar striking the control bar bumper, the slip groove allows the stopper body to slide along a sleeved line and as the stopper body slides along the sleeved line, the brake body pivots about the pivotal link into stop contact with the sleeved line with the stop groove resisting further slippage.

The present invention provides a design and construction method for a kite control bar-stopper that can be repositioned "on the fly", and works well on smooth and flexible sleeved lines. The brake body at least partly consists of a high friction material, such as rubber. Although rubber may simply be used to line the stop groove. The length of the pivotal link is just enough to allow the stopper body to slide up and down the sleeved line when the pivotal link is perpendicular to the sleeved line. By slanting the pivotal link, the distance between the stopper body and the brake body is reduced, causing the stop groove of the brake body to be pressed against the sleeved line increasing friction between the brake body and sleeved line. Such slanting occurs when the control bar strikes the control bar bumper or can be induced by manually pressing against the control bar bumper in a direction parallel to the sleeved line.

Due to the flexible nature of the sleeved line, its diameter will decrease under load from the pinching of the stopper body and the brake body. The bar-stopper according to the invention automatically corrects for the diameter decrement as the pivotal link is further slanted. The resulting force of the brake body pressing on the sleeved line, or brake pressure, is a function of the slant angle. Within the first 30 degree of slant the brake pressure is several times higher than the upward force exerted by the control bar; which, at the time such slant is first induced, is at a very high level. One can see that increasing the length of the pivotal link and therewith the radius of the arc described by the brake body, helps to build sufficient brake pressure to stop the upward force of the control bar. The brake body is preferably made from two materials, a hard structural part and a soft part with high friction for the stop groove.

As sports traction kites are often used on water or other wet conditions, the bar-stopper according to the invention has a brake body that caters for both dry and wet use. To increase grip in wet conditions, transverse grooves can be made in the soft friction material in the stop groove surface. These grooves are useful to drain water from between the brake body and sleeved line. Thus, the present invention involves providing a bar-stopper stopper for kite control bars for sleeved lines, which can be freely positioned on a location on the sleeved line, and automatically adjusts to both the pressure applied by the control bar and the diameter reduction of the sleeved line due to stretching and compression, which works well in both wet and dry conditions.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A control bar stopper will now be described with reference to FIG. 1 through 4.

Figure 1:
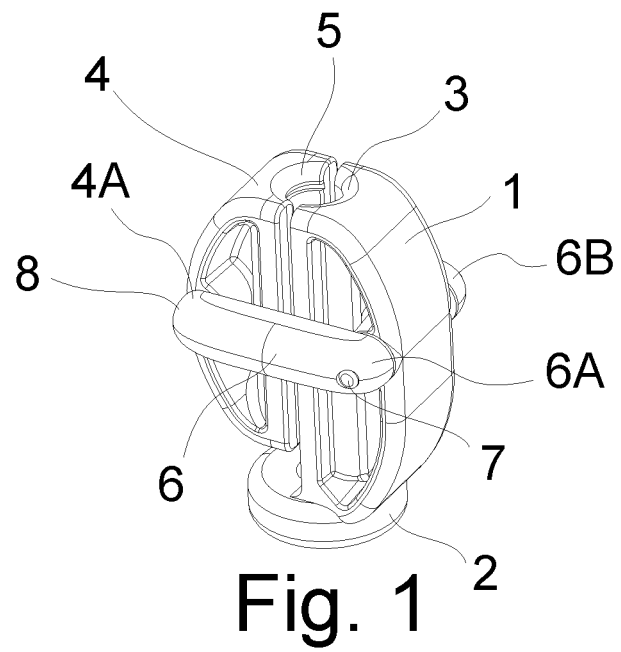
FIG. 1 is a top perspective view of a bar stopper.

Structure and Relationship of Parts:

Referring to FIG. 1, the control bar stopper includes a stopper body 1 having a sleeved line receiving slip groove 3 that allows sleeved line slippage. Stopper body 1 has an underlying control bar bumper 2. A brake body 4 is provided having a sleeved line receiving stop groove 5 that resists sleeved line slippage. Brake body 4 is smaller than stopper body 1 and is positioned above and at a distance from control bar bumper 2 with stop groove 5 facing slip groove 3. Pivotal link 6 is U-shaped having a pair of arms 6A, 6B and a connecting member 8. Connecting member 8 pivots in a pivot groove 4A in brake body 4. Arms 6A and 6B pivot about a pivot pin 7 that extends through stopper body 1.

Figure 2:
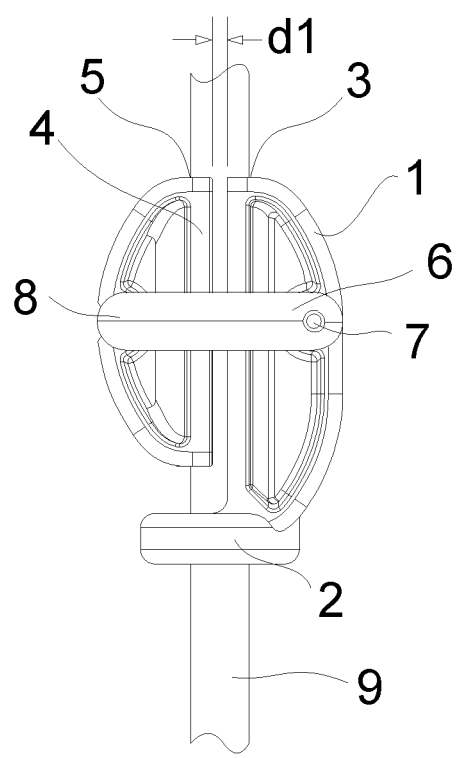
FIG. 2 is a side elevation view of the bar stopper of FIG. 1, with brake pivoted to a release position.

Referring to FIG. 2, stopper body 1 and brake body 4 are shown with slip groove 3 and stop groove 5 positioned on either side of sleeved line 9. It is to be noted that pivotal link 6 is in a neutral position, perpendicular to sleeved line 9. When pivotal link 6 is in this neutral position, the distance "d" between stopper body 1 and brake body pad 4 is at its maximum. In this position, stopper body 1 can be adjusted up and down on sleeved line 9 by hand.

Figure 3:
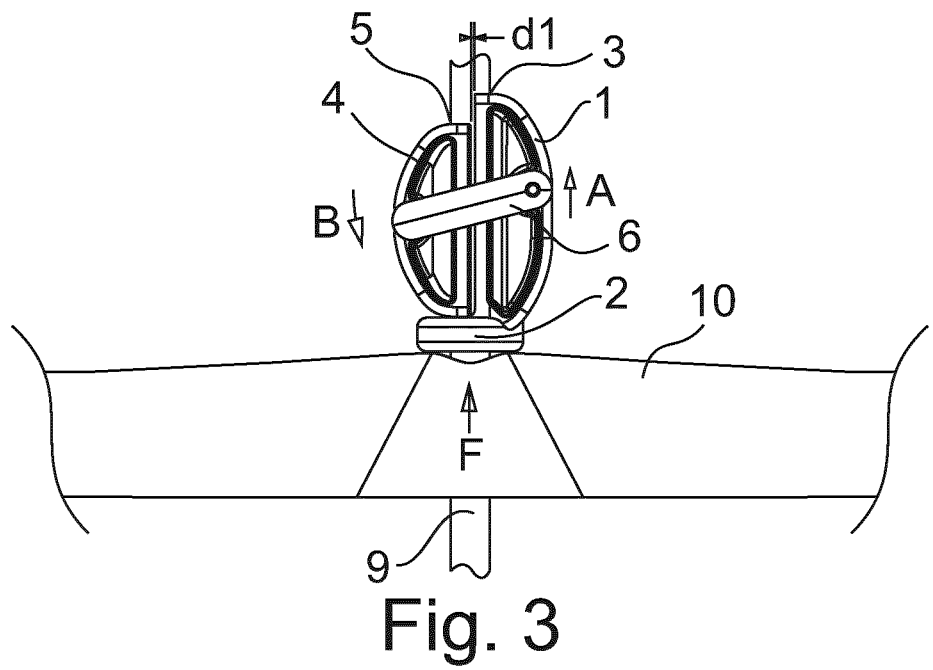
FIG. 3 is a side elevation view of the bar stopper of FIG. 1, with brake pivoted to a locking position.

Referring to FIG. 3, a kite control bar 10 is shown exerting a force "F" against control bar bumper 2 of stopper body 1. Slip groove 3 does not cause much resistance to force "F", resulting in stopper body 1 sliding up sleeved line 9 as shown by arrow "A". Friction from stop groove 5, however, maintains brake body 4 in a fixed position on sleeved line 9. This friction, quickly increases as the slant angle "B" of pivotal link 6 increases and subsequently the distance "d1" between stopper body 1 and brake body 4 decreases.

Figure 4:
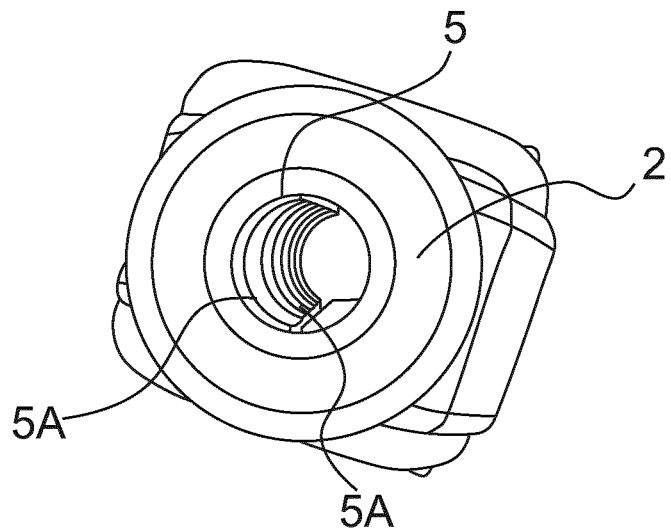
FIG. 4 is a bottom plan view of the bar stopper of FIG. 1.
Figure 5:
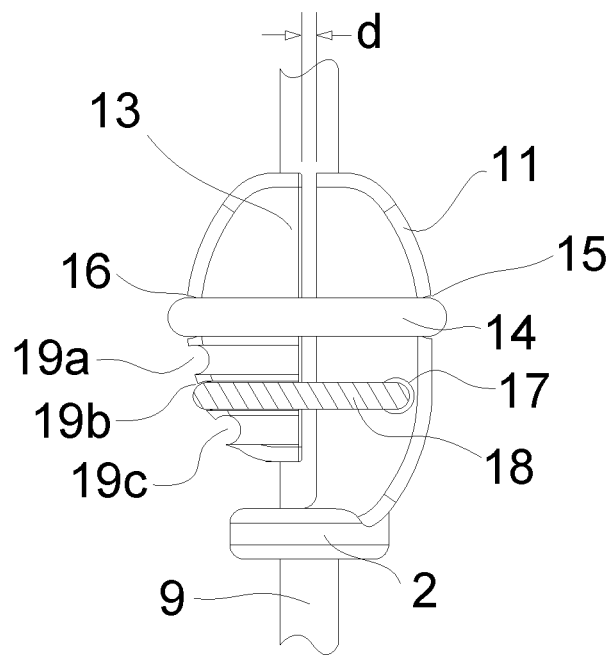
FIG. 5 is a side elevation view of an alternative embodiment of bar stopper with a shock cord tensioner engaged with a first of multiple grooves of differing diameter.
Figure 6:
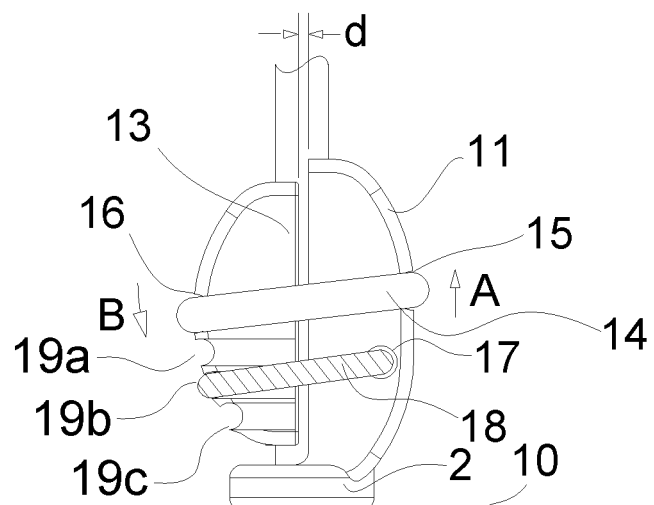
FIG. 6 is a side elevation view of the alternative embodiment of bar stopper of FIG. 5, subjected to a force from a kite control bar.
Figure 7:
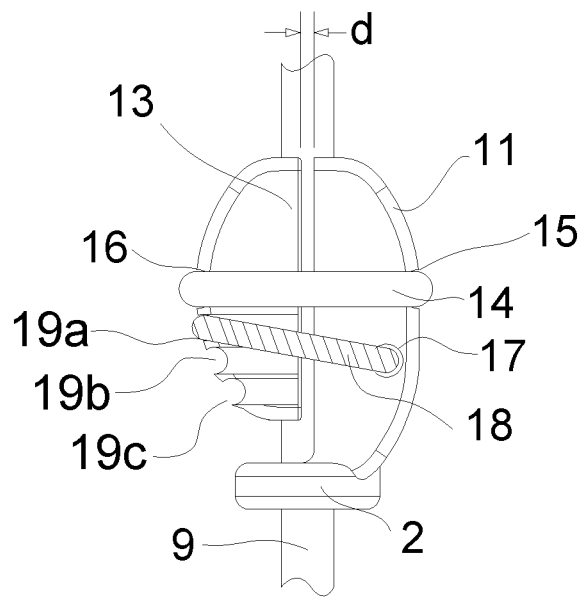
FIG. 7 is a side elevation view of an alternative embodiment of bar stopper of FIG. 5, with the shock cord tensioner engaged with a second of multiple grooves of differing diameter.
Figure 8:
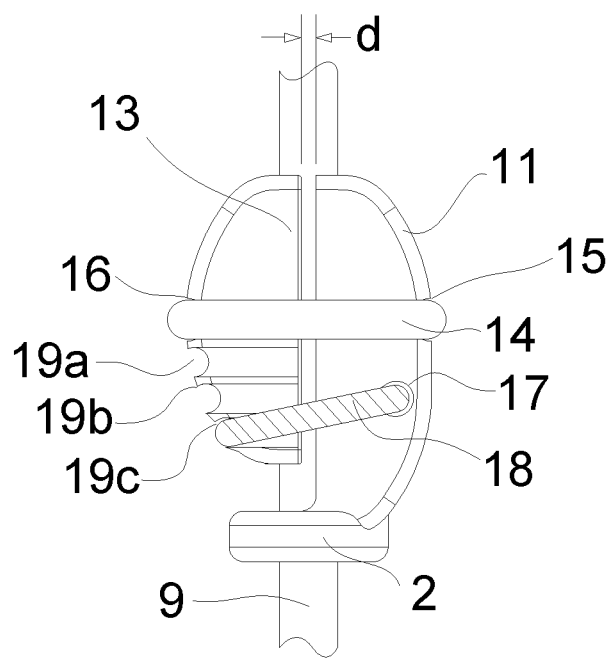
FIG. 8 is a side elevation view of the alternative embodiment of bar stopper of FIG. 5, with the shock cord tensioner engaged with a third of multiple grooves of differing diameter.

Referring to FIG. 4, it is preferred that control bar bumper 2 is a ring. Referring to FIG. 2, control bar bumper 2 encircles sleeved line 9. Referring to FIG. 4, it can also be seen that stop groove 5 has a plurality of ribs 5A.

Operation:

Referring to FIG. 2, sleeved line 9, is positioned between brake body 4 and stopper body 1. Sleeved line 9 is positioned between stop groove 5 of brake body 4 and slip groove 3 of stopper body 1. In response to control bar 10 striking control bar bumper 2, slip groove 3 allows stopper body 1 to slide along sleeved line 9. As stopper body 1 slides along sleeved line 9, stop groove 5 of brake body 4 maintains engagement with sleeved line 9. As stopper body 1 moves along sleeved line 9, pivotal link 6 causes brake body 4 to pivot into ever increasing stop contact with sleeved line 9 with stop groove 5 resisting further slippage.

Variations:

The applicant has chosen to include an alternative embodiment, for the purpose of illustrating alternative structures for pivotal link 6 and also for the purpose of illustrating an added feature using a tensioning cord. Referring to FIG. 5 through FIG. 8, stopper body 11 and brake body 13 engage sleeved line 9 by a pivotal link. However, pivotal link 14 is in the form of a stainless steel box ring that fits into a groove 15 on stopper body 11 and a groove 16 on brake body 13. In a neutral position: pivotal link 14 is perpendicular to the sleeved line 9, thereby keeping the distance d between the stopper body 11 and the brake pad 13 at its maximum. Shock cord tensioner 18 is dead ended on one side on stopper body 11 in hole 17 and is then routed around brake pad 13 and back to stopper body 11 and dead ended on the other side in hole 17. Shock cord tensioner 18 runs through one of multiple grooves 19A, 19B, 19C on brake pad 13. Each of grooves 19A, 19B, 19C represents an alternative tensioning position, as each groove has a differing diameter.

The tension applied by shock cord tensioner 18 pulls stopper body 11 and brake body 13 together, lightly compressing sleeved line 9 so that when pivotal link 14 is perpendicular to the sleeved line 9, the bar stopper will stay in position and yet still be adjustable up and down on the sleeve by hand. The multiple grooves 19 on brake pad 13, allow shock cord tensioner 18 to be adjusted so as to vary the force on sleeved line 9.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A control bar stopper configured to be coupled to a sleeved line of a control bar located between a kiteboarding harness and a kite, wherein the control bar is slidably coupled to the sleeved line and capable of striking the control bar stopper when extended away from the harness along the sleeved line, wherein the control bar stopper, comprises:

a stopper body having a sleeved line receiving slip groove that allows sleeved line slippage, the stopper body having an underlying control bar bumper;

a brake body having a sleeved line receiving stop groove that resists sleeved line slippage, the brake body being smaller than the stopper body and positioned above and at a distance from the control bar bumper with the stop groove facing the slip groove;

a pivotal link connecting the stopper body and the brake body, such that in response to a control bar striking the control bar bumper, the slip groove allows the stopper body to slide along a sleeved line and as the stopper body slides along the sleeved line, the brake body pivots about the pivotal link into stop contact with the sleeved line with the stop groove resisting further slippage.

2. The control bar stopper of claim 1, wherein the pivotal link is U-shaped having a pair of arms and a connecting member, with the connecting member pivoting in a pivot groove in the brake body and the pair of arms pivoting about a pivot pin on the stopper body.

3. The control bar stopper of claim 1, wherein the pivotal link is an endless ring with the ring pivoting in a pivot groove in the brake body and a corresponding pivot groove in the stopper body.

4. The control bar stopper of claim 1, wherein an elastic tension cord is provided to bias the brake body into stop contact with the line, the tension cord being secured to the stopper body and engaging at least one cord groove in the brake body.

5. The control bar stopper of claim 4, wherein there is more than one cord groove in the brake body, each cord groove being positioned on a different diameter portion of the brake body, thereby providing cord positions of differing tension.

6. The control bar stopper of claim 1, wherein the control bar bumper is a ring that encircles the sleeved line.

* * * * *